(12) United States Patent
Levine

(10) Patent No.: US 7,401,011 B1
(45) Date of Patent: Jul. 15, 2008

(54) METHOD FOR SELECTIVE APPLICATION OF ENTERPRISE APPLICATION INTEGRATION PRACTICES

(75) Inventor: Russell M. Levine, Huntington Woods, MI (US)

(73) Assignee: Unisys Corporation, Blue Bell, PA (US)

( * ) Notice: Subject to any disclaimer, the term of this patent is extended or adjusted under 35 U.S.C. 154(b) by 760 days.

(21) Appl. No.: 10/958,829

(22) Filed: Oct. 5, 2004

Related U.S. Application Data

(60) Provisional application No. 60/582,899, filed on Jun. 25, 2004.

(51) Int. Cl.
*G06F 7/60* (2006.01)

(52) U.S. Cl. ............... 703/2; 705/1; 705/22; 707/1; 707/200; 707/102

(58) Field of Classification Search ............... 703/2; 705/1, 22; 707/200, 1, 102; 719/328; 717/110
See application file for complete search history.

(56) References Cited

U.S. PATENT DOCUMENTS

| | | | | |
|---|---|---|---|---|
| 2002/0116362 | A1* | 8/2002 | Li et al. | 707/1 |
| 2002/0188513 | A1* | 12/2002 | Gil et al. | 705/22 |
| 2005/0027495 | A1* | 2/2005 | Matichuk | 703/2 |
| 2005/0138081 | A1* | 6/2005 | Alshab et al. | 707/200 |
| 2005/0198618 | A1* | 9/2005 | Lalonde et al. | 717/110 |
| 2005/0262130 | A1* | 11/2005 | Mohan | 707/102 |
| 2006/0156314 | A1* | 7/2006 | Waldorf | 719/328 |
| 2006/0178890 | A1* | 8/2006 | Marechal et al. | 705/1 |
| 2007/0276674 | A1* | 11/2007 | Hemmat | 705/1 |

OTHER PUBLICATIONS

Arch-int et al., "Development of Industrial information systems on the web using business component", Computers in Industry, 2003.*
Feguson et al., "Websphere as a e-business server", IBM Systems Journal, 2001.*

(Continued)

*Primary Examiner*—Paul L Rodriguez
*Assistant Examiner*—Kandasamy Thangavelu
(74) *Attorney, Agent, or Firm*—Richard J. Gregson; Robert P. Marly; Brooks Kusham P.C.

(57) ABSTRACT

A method for selective application of enterprise application integration (EAI) for a project under consideration involves a computer implemented model. The method includes defining a plurality of sets of EAI practices including a full EAI approach, a partial EAI approach, and a minimal EAI approach. Classifications are defined for each approach. Classifications are defined for applications, business objects, and business processes. The model generates an output indicative of a recommended set of EAI practices. In determining the output, the model considers factors including the classifications for the applications, business projects, and business processes involved in a project.

10 Claims, 3 Drawing Sheets

OTHER PUBLICATIONS

Muller et al., "Software agents for electronic business: Opportunities and challenges", Springer-Verlag, 2002.*

Fingar et al., "Enterprise e-commerce: The software component breakthrough for competitive advantage", CRM2Day.com, 2000.*

Kabilan et al., "Using multi-tier contract ontology to deduce contract work flow models for enterprise process interoperability", Royal Institute of Technology, Stockholm university, 2000.*

Van Gils., "Application of semantic matching in enterprise application integration", University of Netherlands, Feb. 2002.*

Struver, S., "The impact of web services in the context of Enterprise Application Integration in the financial services industry", Institut fur Wirtschaftsinformatik, , Berlin, Nov. 2002.*

* cited by examiner

METHOD FOR SELECTIVE APPLICATION OF ENTERPRISE APPLICATION INTEGRATION PRACTICES

CROSS-REFERENCE TO RELATED APPLICATION

This application claims the benefit of U.S. Provisional Application No. 60/582,899, filed on Jun. 25, 2004, which is hereby incorporated by reference.

BACKGROUND OF THE INVENTION

1. Field of the Invention

The invention relates to enterprise application integration, and to a method for selective application of enterprise application integration practices to a business enterprise.

2. Background Art

In a business enterprise, it is common to use a number of individual software solutions, and a situation arises where multiple software applications must manage the same information. Without application integration, each system has its own data, and data for each system is manually updated to keep all systems in order.

Although a manual update approach may be successful in certain situations, this approach is tedious and may result in data inconsistencies across systems. Enterprise application integration (EAD attempts to address this problem.

EAI is an approach to integrating applications at some level, and results in more reusable information technology (IT) assets and a more agile application portfolio. The investment and return patterns of EAI-based integration solutions differ from traditional integration approaches and therefore they require a different planning approach. EAI typically requires more up front effort. The business case for EAI is that the return exceeds the investment, that is, that the EAI solution creates value.

The problem is that there are many EAI practices, and picking the right ones to apply to a given project may make the difference for both the project at hand and the EAI program in general. A particular problem occurs if EAI is applied too broadly, leading to over-engineered solutions.

For the foregoing reasons, there is a need for an approach where EAI practices are selectively applied only where their value exceeds their cost.

SUMMARY OF THE INVENTION

It is an object of the invention to provide an improved method for selective application of EAI practices. The invention comprehends an IT governance model framework to determine how to apply EAI practices to maximize return.

According to the invention, a method for selective application of enterprise application integration (EAI) for a project under consideration is provided. The project involves applications, business objects, and business processes. The method comprises defining a plurality of sets of EAI practices. The plurality of sets includes a set corresponding to a full EAI approach, a set corresponding to a partial EAI approach, and a set corresponding to a minimal EAI approach. The method further comprises defining a plurality of classifications for applications, defining a plurality of classifications for business objects, and defining a plurality of classifications for business processes. For each type of item for which classifications are defined, the classifications range from most robust to least robust.

The method further comprises establishing a model. The model generates an output indicative of a recommended set of EAI practices. The model determines the output based on factors including the classifications for the applications, business objects, and business processes involved in the project. The model is implemented on a computer and requires a user to input the factors for consideration into the computer. This allows the computer to produce the output. The computer implemented model thereby allows the user to determine the factors to input and the computer to determine the recommended EAI approach from those factors.

According to the invention, the model matches projects to EAI practices based on certain considerations. A first consideration is the fact that different projects have different short-term requirements and long-term implications. A second consideration is the fact that EAI practices and technologies have different costs and benefits in both the long and short term.

Over the short run, a minimal EAI approach provides the best return on investment, while over the long run, a full approach provides the best return on investment. According to the invention, factors are analyzed to access the likelihood of the realization of reuse and flexibility benefits. The greater the likelihood of realization of these benefits, the longer the planning horizon should be. The provided model framework facilitates the determination of how to apply EAI practices to maximize return.

The purpose of making the classifications is to evaluate where the benefits of increased flexibility and potential reuse can be realized. The more flexibility and reuse anticipated, the more robust the classification. The more robust the classification, the longer the planning horizon and therefore the more robust the EAI approach should be. Further, it is appreciated that the Model suggests an EAI approach. Of course, it is understood that certain relevant factors should be considered and addressed informally.

DETAILED DESCRIPTION OF THE PREFERRED EMBODIMENT

Figure 1:
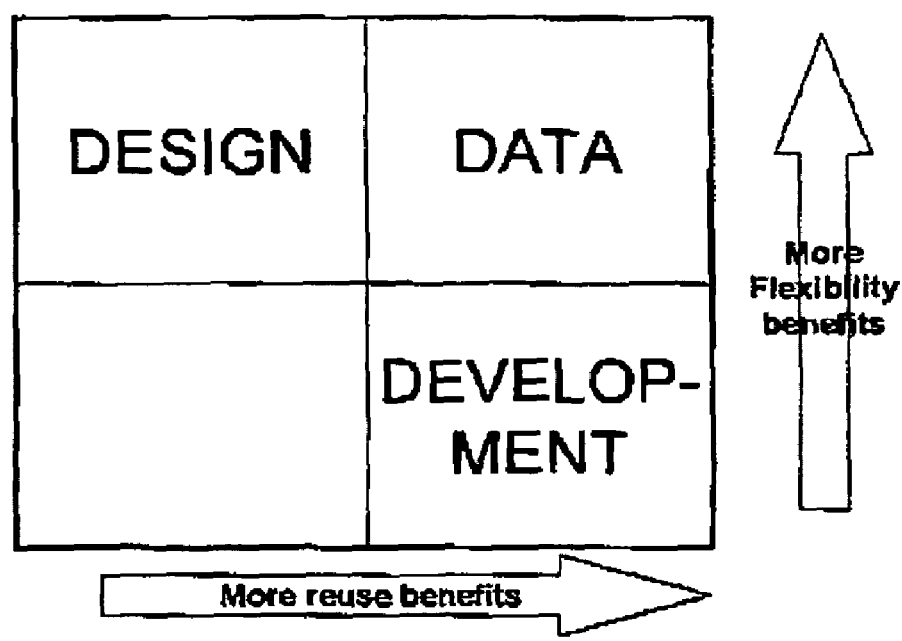
FIG. 1 illustrates the relationship of flexibility and reuse to design, development and data.

EAI initiatives require certain types of investment. Generally, increased costs are expected in terms of infrastructure deployment and support, skills acquisition, software license and management fees and vendor management. The return from an EAI initiative can be viewed in terms of design, development and data. The primary benefits derived from an EAI initiative center around flexibility and reuse. FIG. 1 shows the relationship of flexibility and reuse to design, development and data.

Flexibility is the ability to modify applications independently of one another. The maximum point of asymmetrical influence on flexibility is design. Reuse is the purview of the development process. As assets are reused, reliability and quality increase, and costs are lower.

Returns from improved data management approaches center around reduced information latency and improved data integrity. Reuse here is derived from using common data interchange formats. Flexibility comes from asynchronous event-driven processing which is typically more forgiving than batch or real-time processing.

Design, development and data represent general EAI strategies. Methods of the invention are about selective application of EAI practices so as to determine which specific tools and technologies should be applied to maximize business value. The invention involves a formal planning framework to help decide when and where to invest. Preferably, the model is applied once sufficient analysis has occurred to allow integration requirements to be defined, but before technical design is initiated.

There are two axiomatic considerations in defining this model. First, different projects have different short-term requirements and long-term implications. Second, different EAI practices and technologies have different costs and benefits in both the long and short term.

The following more detailed discussion presents the preferred embodiment of the invention in the form of a formal planning framework wherein a model is established in an attempt to match projects to EAI practices based on the above considerations.

As a starting point, to facilitate the application of EAI practices to EAI opportunities, three sets of EAI practices are defined: a full approach, a partial approach and a minimal approach. A city planning analogy may be used to describe the different EAI approaches. Put another way, consider building a road between two destinations where the road could be a highway, a service street, or a back road. In this same way, think of applications as destinations with the kind of integration approach taken being analogous to the type of road built.

These sets of EAI practices and their analogous road designation are summarized in Table 1 in terms of the typical system development life cycle. Table 2 provides some examples of EAI practices or technologies that could be included in the three approaches.

Figure 2:
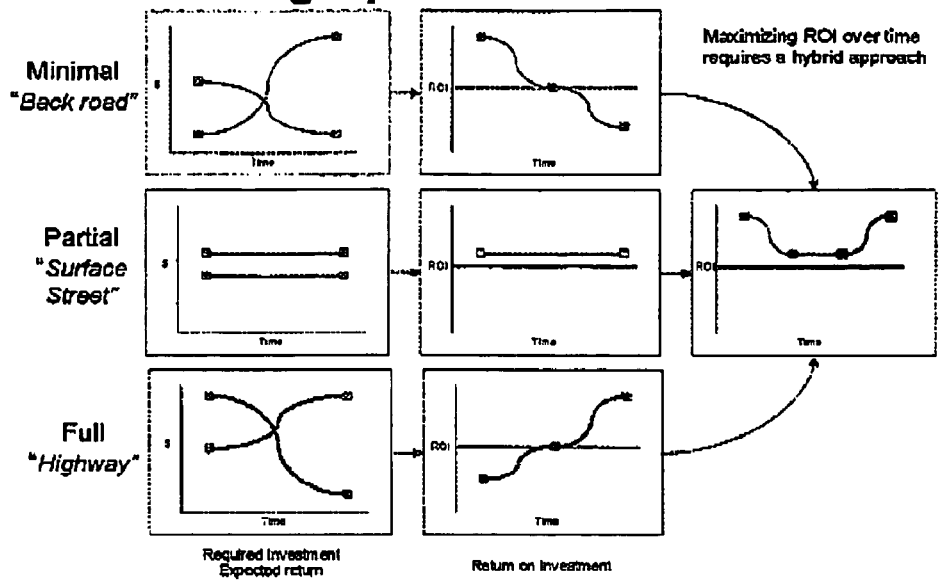
FIG. 2 illustrates EAI planning option profiles.

Accepting these basic approaches, the next step is to match them to project requirements. It is important to consider the investment/return profile for both the short and long run. This is illustrated in FIG. 2, which the following discussion references. Each of the three different EAI approaches has its own profile in terms of investment required and return value expected.

The first column of graphs in FIG. 2 represents the expected return and required investment for each EAI approach over an arbitrary planning horizon. The second column of graphs in FIG. 2 illustrates calculated ROI as the difference between the investment and return over the same horizon. Where returns exceed investments, positive ROI exists.

These figures imply that the ROI for these approaches varies based on the planning horizon. For example, over the short run, the minimal approach has the best ROI. Over the long run, the full approach has the best ROI.

To maximize ROI over all projects, it is necessary to determine what planning horizon is most applicable to the project at hand and then pick the approach that maximizes ROI for that period. This is what the final graph in FIG. 2 depicts.

Now, the question becomes how to determine what planning horizon applies to a given project. The answer to the question starts with the recognition that there are dimensions of commonality implied by the integration requirements of projects that indicate where there is a likelihood of deriving reuse and flexibility benefits. This leads to determination of the appropriate planning horizon. The business and technical requirements of the project are key to the determination of planning horizon.

The greater the likelihood of realizing the benefits of reuse and flexibility, the longer the planning horizon should be. If

TABLE 1

| EAI Approach | City Planning Analogy | EAI Planning | EAI Analysis | EAI Design | EAI Implementation | EAI Infrastructure |
| --- | --- | --- | --- | --- | --- | --- |
| Minimal | Back road | ✓ | ✓ | | | |
| Partial | Surface street | ✓ | ✓ | ✓ | | |
| Full | Highway | ✓ | ✓ | ✓ | ✓ | ✓ |

TABLE 2

| EAI Approach | Patterns | Process Technology | Data Modeling | Technology |
| --- | --- | --- | --- | --- |
| Full | 1-M, M-1, M-M<br>Hub and spoke<br>Pub/sub, content-based routing,<br>request/reply | Infrastructure (broker or adapter) configuration<br>State management<br>Application-based event capture and resolution | Formal XML models<br>Address enterprise requirements<br>UML activity diagrams | Infrastructure transport<br>Map via broker configuration or shared custom transforms<br>Web services |
| Partial | De-coupled point-to-point<br>Event-driven<br>Asynchronous path | Non-invasive application coding<br>Activity-based process control | Formally documented intermediate formats<br>Address current requirements only<br>UML collaboration diagram | Transport via intermediate storage or queues<br>Application-specific coded maps to intermediate formats<br>Service-Oriented Architecture based on legacy technology |
| Minimal | Point-to-Point<br>Batch, DB look-up<br>Pull | Extend existing interfaces<br>Application coding<br>Time-based process control | Informal agreements<br>Update existing enterprise data models | Direct application database access<br>Application-specific coded maps | benefits are unlikely to be realized, investments are justified. If the project is less likely to realize these benefits, less investment is warranted.

Following the city planning analogy previously introduced, consider buildings as destinations (for applications), traffic patterns (for business processes) and vehicles (for data or business objects) as input to the road planning decision.

By understanding the classes of buildings, traffic patterns, and vehicles required, it is possible to then determine what kind of road to build. There is a finite number of combinations of classifications. For each, a suggested type of road—or EAI planning approach—is assigned. By making these assignments up-front, it is possible to have predetermined guidelines available when projects are encountered. To apply the model, when presented with a specific project, the relevant applications, business processes and business objects are classified. The predetermined guidelines are then consulted to determine the suggested planning approach.

Table 3 is an example of such a classifications scheme. Applications, deemed buildings for classification purposes, are classified as industrial, commercial or residential. Business objects, or the data being exchanged, deemed vehicles for classification purposes, are classified as trucks, cars or bikes. Business processes deemed traffic patterns for classification purposes, are classified as a delivery, commute or a leisure trip.

TABLE 3

| Applications (Buildings) | Industrial | Commercial | Residential |
| --- | --- | --- | --- |
| Fan-out/in (connection count | More than 5 | 3 to 5 | 1 to 2 |
| Diversity of users | Multiple groups | Group-wide | Departmental |
| Mission Critical | Yes | Yes | No |
| COTS | Yes | Yes | No |
| Life expectancy | Indefinite | Long-term replacement | Short-term replacement |
| Frequency of change | Monthly | Quarterly | Yearly |
| Extent of change | Monthly | Quarterly | Yearly |
| Processes (Trips/Traffic Patterns) | Delivery | Commute | Leisure |
| Application span | More than 5 | 3 to 5 | 1 to 2 |
| Mission Critical | Yes | Yes | No |
| Latency tolerance | Minutes | Hours | Days |
| Frequency of execution | Hourly | Daily-Weekly | Monthly |
| Complexity (# of branches) | More than 5 | 3 to 5 | 1 to 2 |
| Frequency of change | Quarterly | Yearly | Rarely |
| Extent of change | Structural | Process rules | Minor |
| Business Objects (Vehicles) | Truck | Car | Bike |
| Application span | More than 5 | 3 to 5 | 1 to 2 |
| Representations | More than 5 | 3 to 5 | 1 to 2 |
| Fidelity target | Single source | 3 to 5 | 5 or more |
| Frequency of change | Quarterly | Yearly | Rarely |
| Extent of change | Structural | Mapping rules, data elements | Attributes |

The essential purpose of these ratings for each of these dimensions is to evaluate where the benefits of increased flexibility and potential reuse can be realized. The more flexibility or reuse anticipated, the more robust the classification. The more robust the classification, the longer the planning horizon should be and therefore the more robust the EAI approach should be.

Figure 3:
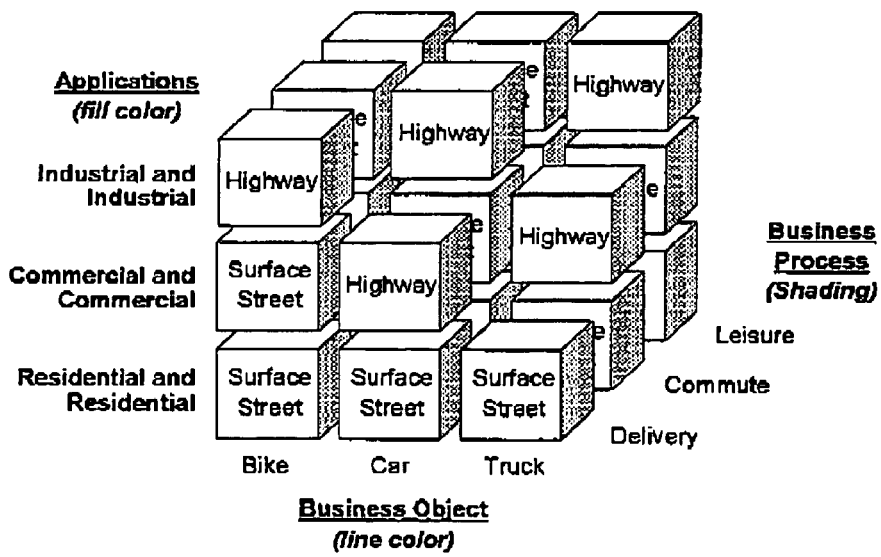
FIG. 3 is an example of a classification possibility cube.

Dimension classification is step one in applying the model. Step two is identifying the appropriate planning horizon based on those classifications. An example of planning horizon determination follows. For ease of explanation, consider an exemplary integration involving two applications. One way to visualize all of the potential combinations of classifications is shown in FIG. 3 which is an example of a classification possibility cube with a few a pieces removed for clarity. In the example, an integration involving two commercial class applications, a car class business object and a delivery class trip would suggest a highway—a full EAI integration approach.

It is appreciated that the classification possibility cube suggests an EAI approach. However, it is understood that certain relevant factors should be considered and addressed informally. In this same way, care should be taken to assure that the informal factors do not dominate the decision process, but the informal factors should be considered. It is anticipated that 80% of the relevant factors could be accounted for by the classification possibility cube with the remaining 20% of the relevant factors being addressed informally.

The following discussion provides examples of factors that may influence the EAI planning approach, and may be better handled informally.

One such factor is the degree of existing interface support. That is, an identified integration requirement may already be fully or partially supported. A determination must be made as to whether it is justified to replace functionality that is already in place. Technical factors may be considered at this point. For example, instability of the current interfaces or the fact that they are deployed using orphaned technology may lead to replacing them to mitigate technical risk.

Another such factor is the set of technology challenges faced. This issue relates to tool availability. For example, consider a situation where certain integration points have been identified as being suitable for implementation via an integration broker. If the current integration broker does not currently have relevant technical or application adapters available (or they do not behave as required), it would be appropriate to factor in the cost of developing such adapters to take an integration broker approach. The application architecture of application interfaces may also need to be taken into consideration. For package applications, this often is in the form of APIs. If the relevant APIs are not present, this can severely curtail the ability to leverage the more robust approaches. In the case of legacy systems, there is typically more control at the source code level. However, sometimes the fundamental structure of the application may prevent the exposure of key functionality, so another less robust course of action may be necessary.

Another such factor is project timing. Finally, there may be a window of opportunity that may not allow the additional time required to develop fully reusable assets. As it takes longer to develop assets that are reusable or have higher degrees of flexibility, if current project requirements require implementation within a given time frame to be viable, the investment may not be possible. For example, if regulations require certain changes to be made by a hard date, it does not matter if returns would be better with a less aggressive implementation date, as this is not compatible with project requirements.

So in this way, it is appreciated that the classification possibility cube suggests an EAI approach. The idea is to use the suggested approach as a starting point and then consider whether any deviations might be appropriate. The advantage is that the starting point should be close to the final decision, as opposed to being some arbitrary point on either end of the spectrum. In addition, using the model should provide greater overall confidence that investments are being made where they are most likely to generate benefits.

It is appreciated that the scope of the model comprehends establishing the EAI planning approach. The model exemplified above in the preferred embodiment, provides a methodology for the selective application of enterprise application integration (EAI) practices to a business enterprise. After establishing the EAI planning approach, designing, building and testing to complete the project may commence.

In accordance with the invention, selective application of EAI practices to a business enterprise should lead to better investments than the traditional one size fits all approach to the application of EAI practices which typically leads to suboptimal investments. An IT governance model in accordance with the invention can provide a consistent, rational process for the selection of EAI practices based on reuse and flexibility benefits to optimize the EAI investments. In applying EAI practices, it is important to consider reuse potential and requirements for flexibility in terms of applications, data and process. Further, the key time to consider these factors is after integration analysis and before integration design.

Figure 4:
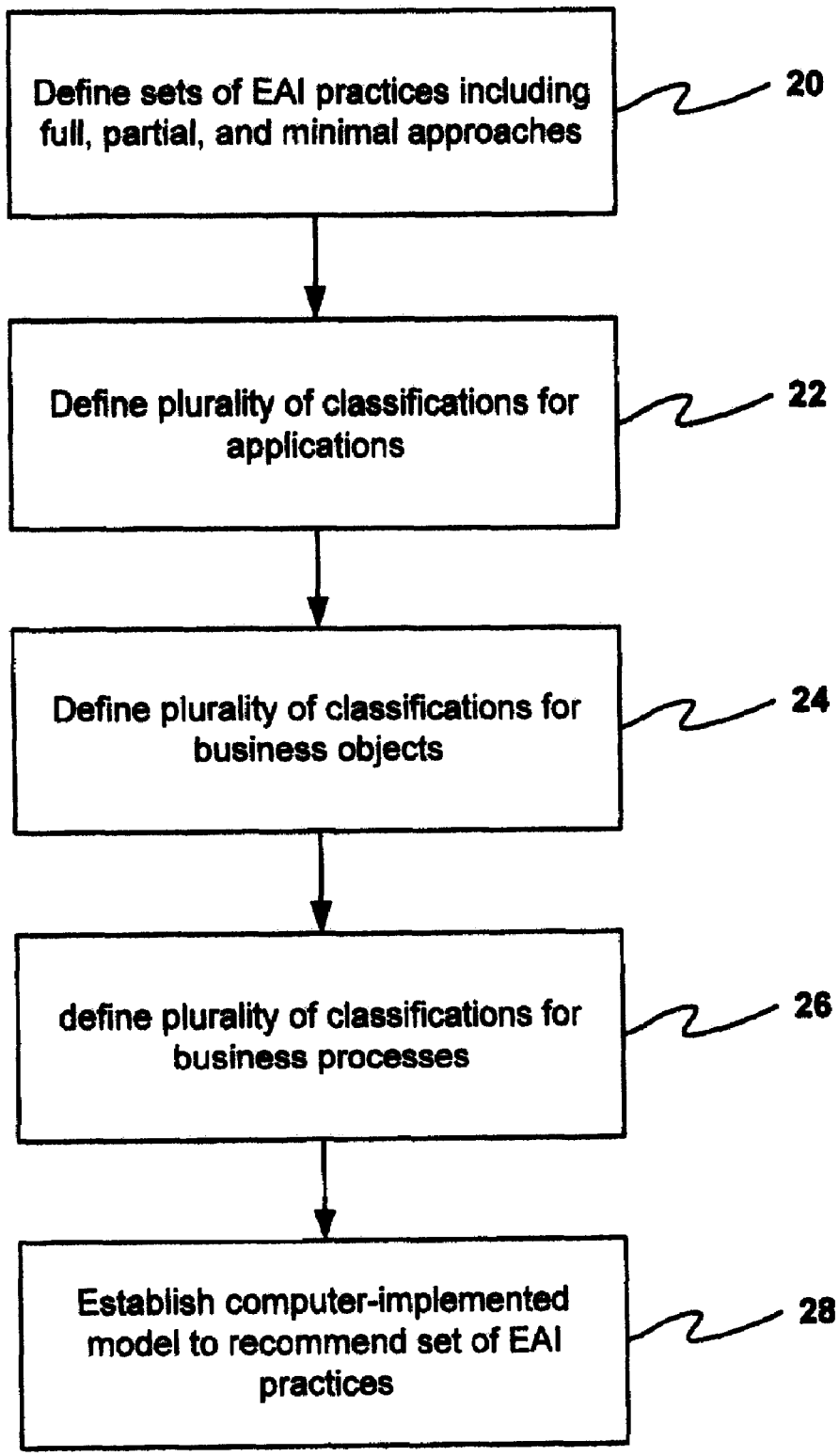
FIG. 4 is a block diagram illustrating a method of the invention.

FIG. 4 illustrates a method of the invention. At block 20, sets of the EAI practices including full, partial, and minimal approaches are defined. At block 22, a plurality of classifications for applications are defined. At block 24, a plurality of classifications for business objects are defined. At block 26, a plurality of classifications for business processes are defined. At block 28, a computer-implemented model is established. The model requires a user to input the factors for consideration into the computer to allow the computer to produce the output. The computer implemented model thereby allows the user to determine the factors to input and the computer to determine the recommended EAI approach from those factors. Input factors include the classifications for the applications, business objects, and business processes involved in a project under evaluation.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A computer implemented method for selective application of enterprise application integration (EAI) for a project under consideration, the project involving applications, business objects, and business processes, the method comprising:
defining a plurality of sets of EAI practices, the plurality of sets including a set corresponding to a full EAI approach, a set corresponding to a partial EAI approach, and a set corresponding to a minimal EAI approach;
defining a plurality of classifications for applications, the classifications ranging from most robust to least robust;
defining a plurality of classifications for business objects, the classifications ranging from most robust to least robust;
defining a plurality of classifications for business processes, the classifications ranging from most robust to least robust;
establishing a model, the model generating an output indicative of a recommended set of EAI practices, the model determining the output based on factors including the classifications for the applications, the classifications for business objects, and the classifications for business processes involved in the project;
wherein when the model is executed:
user inputting the factors related to the project into the computer; and
the model determining the recommended set of EAI practices for the project from those factors.

2. The method of claim 1 further comprising:
for the project under consideration, classifying each application;
for the project under consideration, classifying each business object; and
for the project under consideration, classifying each business process.

3. The method of claim 2 further comprising:
applying the model to the project under consideration such that the model generates an output indicative of the recommended set of EAI practices for the project under consideration, the output being determined based on factors including the classifications for the applications, the classifications for business objects, and the classifications for business processes involved in the project under consideration.

4. The method of claim 3 wherein the model has a finite number of inputs resulting in a finite number of combinations for the inputs, the model defining an output for each possible combination.

5. The method of claim 3 further comprising:
for the application classifications, establishing a classification scheme.

6. The method of claim 3 further comprising:
for the business object classifications, establishing a classification scheme.

7. The method of claim 3 further comprising:
for the business process classifications, establishing a classification scheme.

8. The method of claim 3 further comprising:
determining a set of EAI practices based on the model output and further based on a plurality of factors excluded from the model implementation.

9. A computer system implementing a program of instructions to perform a method for selective application of enterprise application integration (EAI) for a project under consideration, the project involving applications, business objects, and business processes, the method comprising:
defining a plurality of sets of EAI practices, the plurality of sets including a set corresponding to a full EAI approach, a set corresponding to a partial EAI approach, and a set corresponding to a minimal EAI approach;
defining a plurality of classifications for applications, the classifications ranging from most robust to least robust;
defining a plurality of classifications for business objects, the classifications ranging from most robust to least robust;
defining a plurality of classifications for business processes, the classifications ranging from most robust to least robust;
establishing a model, the model generating an output indicative of a recommended set of EAI practices, the model determining the output based on factors including the classifications for the applications, the classifications for business objects, and the classifications for business processes involved in the project;
wherein when the model is executed:
user inputting the factors related to the project into the computer; and
the model determining the recommended set of EAI practices for the project from those factors.

10. The method of claim 9 wherein the model has a finite number of inputs resulting in a finite number of combinations for the inputs, the model defining an output for each possible combination.

* * * * *